United States Patent [19]

Ott

[11] Patent Number: 4,546,320
[45] Date of Patent: Oct. 8, 1985

[54] TOTAL TEMPERATURE PROBE BUFFER AMPLIFIER

[75] Inventor: William E. Ott, San Pedro, Calif.

[73] Assignee: The United States of America as represented by the Secretary of the Air Force, Washington, D.C.

[21] Appl. No.: 580,979

[22] Filed: Feb. 16, 1984

[51] Int. Cl.⁴ .............................................. G01K 7/18
[52] U.S. Cl. ...................................... 328/3; 307/310; 330/256; 374/144; 374/173
[58] Field of Search ................. 330/69, 256, 258, 260, 330/289; 328/3; 307/310; 374/172, 173, 183–185, 144; 364/557; 323/369

[56] References Cited

U.S. PATENT DOCUMENTS

| | | | |
|---|---|---|---|
| 3,754,442 | 8/1973 | Arnett | 374/173 |
| 3,792,366 | 2/1974 | Jornod | 330/22 |
| 3,940,707 | 2/1976 | Fernandez | 330/29 |
| 4,169,243 | 9/1979 | Payne et al. | 374/172 X |
| 4,185,251 | 1/1980 | Brown et al. | 330/279 |
| 4,218,613 | 8/1980 | Bletz | 250/214 A |
| 4,326,171 | 4/1982 | Shaw et al. | 330/256 |
| 4,349,788 | 9/1982 | Sondermeyer | 330/293 |

FOREIGN PATENT DOCUMENTS 16250 2/1977 Japan .................................. 374/173

Primary Examiner—James B. Mullins
Attorney, Agent, or Firm—Donald J. Singer; William G. Auton

[57] ABSTRACT

The elimination of undesirable thermally induced changes of electrical characteristics of signal components is accomplished three operational amplifier circuits. The first operational amplifier provides electrical power to a system critical component and produces a reference output signal composed of the desirable function produced by the system critical components plus the undesirable thermally induced signal components produced by the changes of the electrical characteristics of two identical lead wires connected to the system critical component. The second operational amplifier circuit senses the voltage drop in one of the two identical lead wires attached to the critical component. The second operation amplifier produces a sensing output signal that changes in value with the undesirable thermally induced changes of the electrical characteristics of one of the lead wires. Since the two lead wires are identical in resistance characteristics the sensing output signal varies proportionately with the total undesirable electrical signal components encountered. The third operational amplifier circuit is a subtraction circuit producing a system output signal proportionate with the difference between the reference output signal and the sensing output signal. The result is a system output signal with all undesirable thermally induced signal components eliminated.

1 Claim, 1 Drawing Figure

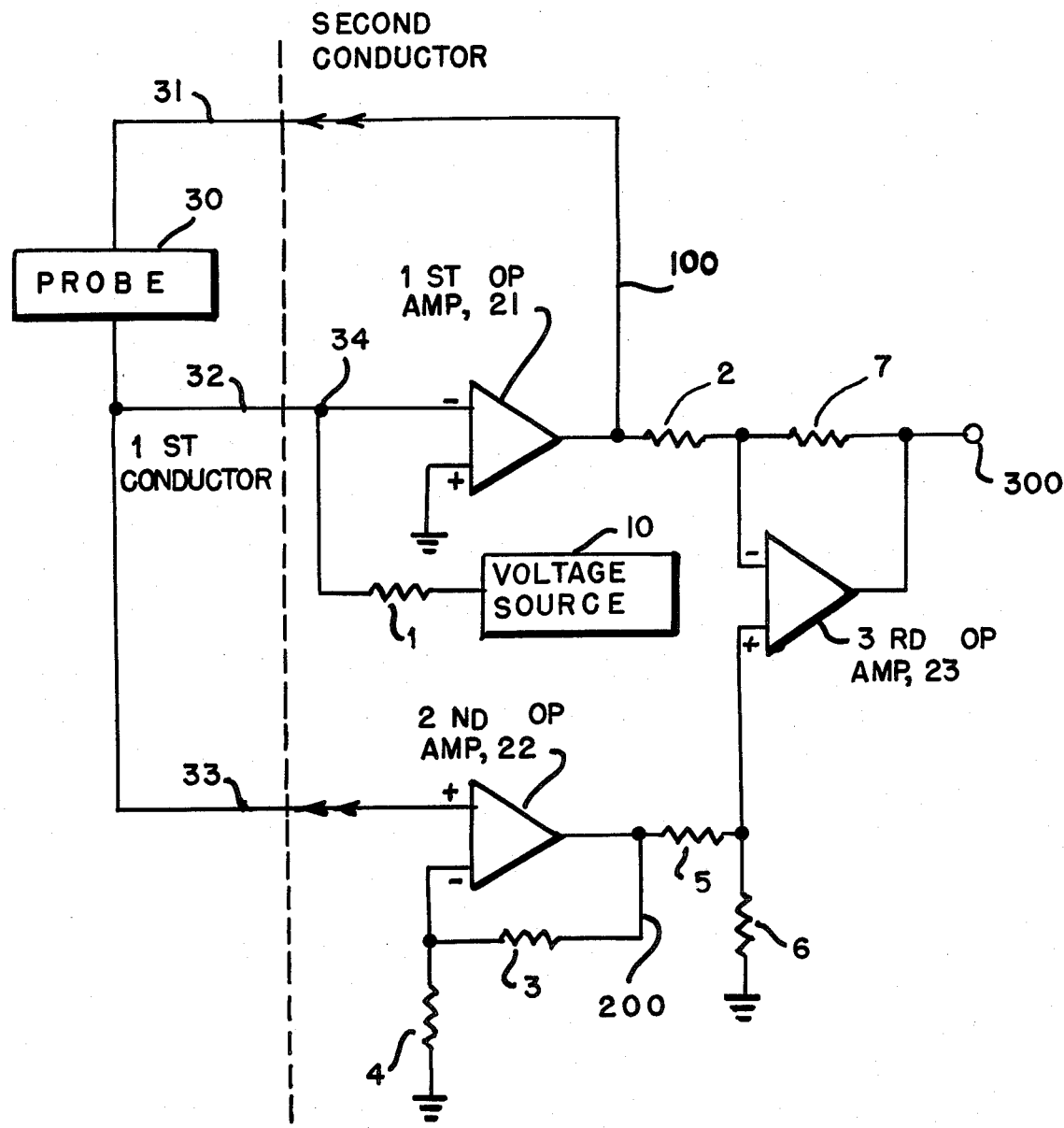

TOTAL TEMPERATURE PROBE BUFFER AMPLIFIER

STATEMENT OF GOVERNMENT INTEREST

The invention described herein may be manufactured and used by or for the Government for governmental purposes without the payment of any royalty thereon.

BACKGROUND OF THE INVENTION

The present invention relates to temperature probes used to monitor temperatures of turbine engines and specifically to a temperatures probe buffer amplifier to provide continuous compensation for thermally induced changes in the resistances of wiring connected to the temperature probe.

Modern engine control systems have temperature probe circuits which are subject to changes in the electrical resistance of its wiring induced by changes of temperature. While certain Resistance Temperature Device (RTD) probes have precisely known responses to changes in temperature, the usefulness of such probes is frustrated since the wires connected to the probes are also subject to changes in electrical characteristics caused by changes in temperature. What is needed is a means or circuit which will allow the use of such RTD probes, yet enable the probe to be responsive to changes in temperature while the host circuit connected to the probe remains in some manner immune to the effects of heat.

This task has been alleviated to some degree by prior art techniques that are designed to provide ambient temperature compensation features. The extent of these prior art techniques is given by the following patents:

U.S. Pat. No. 3,792,366 issued to Jornod on Feb. 12, 1974

U.S. Pat. No. 3,940,707 issued to Fernandez on Feb. 24, 1976

U.S. Pat. No. 4,185,251 issued to Brown, Jr. et al on Jan. 22, 1980

U.S. Pat. No. 4,218,613 issued to Bletz on Aug. 19, 1980 and

U.S. Pat. No. 4,349,788 issued to Shaw et al on April 20, 1982.

While the above patents are instructive as to temperature compensation techniques, the specific devices they disclose are unsuitable to all needs. The Brown et al, Bletz and Fernandez devices comensate for voltage variations of automatic gain control (AGC) devices in which the internal circuitry of the AGC is affected by changes in temperature. In the present case, it is desirable that the RTD probe experience changes in electrical characteristics with changes of temperature: it is just the external circuitry connected to it which requires a means of temperature compensation. The Jornod and Shaw inventions provide for temperature compensation, but requires different adjustments and settings to be made to elements of the circuit Jornod and Shaw et al circuits, which include temperature sensitive resistors or thermistors in the input circuits of operational amplifiers, are unnecessary complex, and are not automatic in that they require adjustments.

In view of the foregoing, it is apparent that there currently exists the need for a device which automatically compensates for the thermal effects of external wiring of a temperature probe without any further adjustments being required. The present invention is directed towards satisfying that need.

SUMMARY OF THE INVENTION

This invention provides a means of automatically compensating for thermally induced changes in the resistance of wires connected to RTD probes which monitor engine temperatures.

In order to provide continuous compensation for thermally induced changes in the resistances of wires connected to temperature probes, the present invention uses three operational amplifier circuits and two lead wires with identical resistance properties.

The Resistance Temperature Device is connected to the first operational amplifier circuit by the two lead wires. The first operational amplifier provides electrical power to the probe and produces a reference output signal composed of the desired function produced by the probe plus the undesirable signal components produced by the thermally induced changes in resistances in the two lead wires.

The second operational amplifier circuit senses the voltage drop in one of the two lead wires and produces a sensing output signal that changes in value and in proportion with the undesirable signal components of that lead wire. Since the two lead wires are identical and have identical resistance characteristics, the sensing output signal varies proportionately with the total undesirable electrical signal components.

The third operational amplifier circuit is a subtraction circuit producing a system output signal proportionate with the difference between the reference output signal produced by the first amplifier circuit and the sensing output signal produced by the second amplifier circuit. The result is a system output signal with all the undesirable thermally induced signal components eliminated.

It is a principal object of the invention to provide continuous compensation for thermally induced changes in the electrical resistances of wiring connected to certain Resistance Temperature Device probes.

It is another object of this invention to a means for using such probes which require no adjustments and provides automatic compensation for the thermal effects on the host circuits supporting such RTD probes.

These together with other objects features and advantages of the invention will become more readily apparent from the following detailed description when taken in conjunction with the accompanying drawing wherein like elements are given like reference numerals throughout.

DESCRIPTION OF THE DRAWINGS

The sole FIGURE of the drawing is a functional block diagram of one embodiment of the present invention.

DETAILED DESCRIPTION OF THE PREFERRED EMBODIMENT

This invention provides a means of automatically compensating for thermally induced changes in the resistance of wires connected to RTD probes which are used to monitor engine temperatures.

The sole FIGURE is a functional block diagram of one embodiment of the present invention. In order to provide continuous compensation for thermally induced changes in the resistances of wiring connected to the temperature probe 30, this embodiment of the invention uses the following: three operation amplifiers 21-23, two identical lead wires connected to the RTD probe 31 and 32, one sensing wire 33, seven resistors 1-7 and a system voltage source 10.

The system voltage source 10 introduces a voltage of value V(s) into one terminal of input resistor 1 of value $R_1$ ohms.

Input resistor 1 conducts a current to an electrical terminal 34 which is electrically connected to: resistor 1, the inverting input terminal of the first operational amplifier 21, and one of the identical lead wires 32. The value of the current flowing through resistor 1 is of value $V(s)/R_1$, neglecting the input offsets of amplifier 21. The current in the input resistor is forced to flow through the first lead wire 32, the RTD probe 30 and the second lead wire 31 by the high gain of the first operational amplifier. This high gain occurs since the second lead wire 31 is connected to the output terminal of the first operational amplifier 21 and the non-inverting input terminal of the first operational amplifier 21 is connected to an electrical ground.

The output voltage signal 100 of the first operational amplifier 21 is of value $V_1$ which is given by the equation:

$$V_1 = \frac{-V_{(s)}}{R_1}(RTD + R_{W1} + R_{W2})$$

when:

$V_{(s)}$ equals the value of the system voltage source 1;
$R_1$ equals the value in ohms of the first input resistor 1;
$R_{TD}$ equals the value in ohms of the resistors of the RTD probe 30;
$R_{W1}$ equals the resistance value of the first lead wire 32, and
$R_{W2}$ equals the resistance value of the second lead wire 31.

This voltage output signal 100 may be referred to as the reference signal which changes in value proportionately with the changes in resistance of: the two lead wires 31 and 32, and the RTD probe 30. The amplification circuit, described above, that produces this reference signal may be referred to as the reference amplification circuit.

The next portion of the invention is a sensing amplification circuit which produces an output voltage signal or sensing signal that changes in value proportionately with changes of the resistance values of the lead wires only. This sensing amplifier circuit is described as follows:

A sensing wire 33 is connected to the first lead wire 32 at the point where it connects to the terminal of the RTD probe 30. Sensing wire 33 is also connected with the non-inverting input terminal of the second operation amplifier 22.

The second operational amplifier 22 has a feedback resistor which is connected to its output terminal and the inverting input terminal. Also connected to the inverting input terminal of the second operational amplifier is an input resistor 4. In this configuration the gain of the amplifier is controlled by the rate of the feedback resistor 3 to the input resistor 4.

The sensing voltage signal 200 of the second operation amplifier 22 is of value $V_2$ which is given the the equation:

$$V_2 = \frac{-V_{(s)}}{R_1} R_{W1} \frac{(R_3 + R_4)}{R_4}$$

Where
V(s) $R_1$, and $R_{W1}$ are as defined above and:
$R_4$ = resistance value of input resistor 4; and
$R_3$ = resistance value of the feedback resistor 3.

In the present invention the input resistor 4 is selected to have the same resistance as the feedback resistor 3. Therefore the sensing output voltage signal 200 is:

$$V_2 = -2R_{W1}\frac{V_{(s)}}{R_1}$$

The reference output signal 100 of the first operational amplifier 21 and the sensing output signal 200 of the second operational amplifier 22 are finally processed by a differencing amplification circuit. This differencing circuit will eliminate the signal effects of the two lead wires 31 and 32 by subtracting the reference output signal 100 from the sensing output signal.

The reference output voltage signal is conducted through the input resistor 2 which connects the output terminal of the first operational amplifier into the inverting input terminal of the third operational amplifier.

The sensing output voltage signal 200 is conducted by the input resistor 5 which connects the output terminal of the second operational amplifier 22 with the non-inverting input terminal of the third operational amplifier 23. The non-inverting input terminal of the third operaton amplifier 23 is also electrically connected with a ground by the input resistor 6.

The output terminal of the third operational amplifier 23 has a feedback resistor 7 connected with its inverting input terminal. This invention is designed such that the feedback resistor 7 is of the same value as the input resistor 6 and the input resistor 2 is of the same value as the input resistor 5. In the particular embodiment resistors 2-7 are all of 1.9K ohms in value and the first input resistor 1 is of 1.OK ohms in value.

The differencing output voltage signal 300 of the third operational amplifier 23 is of value $V_3$ which may be determined by the equation:

$$V_3 = \frac{R_7}{R_2}(V_2 - V_1)$$

Where
$V_2$ and $V_1$ are as described above; and
$R_7$ = the resistance value of the feedback resistor 7; and
$R_2$ = the resistance value of the input resistor 2.

Since $$V_2 - V_1 = RTD\frac{V_{(s)}}{R_1}$$

the overall function of the invention is to produce an output signal 300

$$V_3 = R_{TD} \cdot \frac{(V_{(s)})}{R_1} \cdot \frac{(R_7)}{R_2}$$

The differencing output voltage signal is now a product of known inputs which varies precisely with the changes in resistance of the RTD probe, with the effects of the changes in resistance of the two identical lead wires 31 and 32 eliminated entirely. The invention is able to successfully subtract out the effects of the lead wires 31 and 32 only if they are of the same length, gauge and possessing the same resistance characteristics.

For purposes of description the invention is described as eliminating the undesirable thermally induced signal components of circuits supporting a thermal probe. However, the invention has a somewhat broader, range of application, and may be used to eliminate the undesirable thermally induced signal components of circuitry supporting any system critical component in which the system critical component performs some desirable function and requires a supporting circuitry providing electrical power uncontaminated by thermal effects.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. In combination with a critical element that generates an electrical signal in response to stimuli and that has an input and output and a electrical resistance therebetween, a buffer amplifier circuit comprising, first, second and third operational amplifiers, each having a negative input, a positive input and an output, first and second electrical conductors having substantially equal resistance values, a voltage source, and first, second, third, fourth, fifth, sixth and seventh resistors, said first electrical conductor connecting the input of said critical element to the negative input of said first operational amplifier, said second electrical conductor connecting the output of said critical element to the output of said first operational amplifier, said voltage source connected to the negative input of said first operational amplifier thriug said first resistor, said second and seventh resistors connected in series between the outputs of said first and third operational amplifiers, the negative input of said third operational amplifier connected to the junction of said second and seventh resistors, the positive input of said third operational amplifier being connected to ground through said sixth resistor, to the output of said second operational amplifier through said fifth resistor, and to the negative input of said second operational amplifier through the same conbination of said fifth and third resistors, said second operational amplifier having its positive input connected to the input of said critical element and its negative input connected to ground through said fourth resistor.

* * * * *